United States Patent [19]
Timtner

[11] 3,978,950
[45] Sept. 7, 1976

[54] FRICTIONAL OVERRUNNING CLUTCH

[75] Inventor: Karlheinz Timtner, Bad Homburg vor der Hohe, Germany

[73] Assignee: Ringspann Albrecht Maurer K.G., Bad Homburg vor der Hohe, Germany

[22] Filed: Aug. 19, 1975

[21] Appl. No.: 605,875

[30] Foreign Application Priority Data
Aug. 19, 1974 Germany............................ 2439682

[52] U.S. Cl................................ 192/41 A; 192/45.1
[51] Int. Cl.²........................................ F16D 41/07
[58] Field of Search......................... 192/41 A, 45.1

[56] References Cited
UNITED STATES PATENTS

| | | | |
|---|---|---|---|
| 3,019,873 | 2/1962 | Ferris et al........................... | 192/45.1 |
| 3,743,066 | 7/1973 | De Lavalette et al............. | 192/41 A |
| 3,819,019 | 6/1974 | Timtner............................ | 192/41 A |

Primary Examiner—Allan D. Herrmann
Attorney, Agent, or Firm—Spencer & Kaye

[57] ABSTRACT

A radially wedging, frictional overrunning sprag clutch has an inner ring defining an inner sprag track and an outer ring which is concentric with respect to the inner ring and defines an outer sprag track. While varying the ring thickness ratio of at least one of the two clutch rings in the sense of a maximum of the quotient driving torque/angle of rotation, the radius of the inner track is determined by subtracting from the nominal radius of the inner track the extent of compression of the inner ring, at the location of contact with the sprags, caused by an assumed normal force. The radius of the outer track is determined by adding to the nominal radius of the outer track the extent of expansion of the outer ring, at the location of contact with the sprags, caused by an assumed normal force.

9 Claims, 4 Drawing Figures

FRICTIONAL OVERRUNNING CLUTCH

BACKGROUND OF THE INVENTION

This invention relates to a radially wedging, frictional overrunning clutch having z sprags of a profiled section (z being the number of sprags) which are arranged in a circumferential series between a cylindrical inner track having a diameter $D_i = 2R_i$ and a cylindrical outer track which is arranged concentrically with respect to the inner cylindrical track and which has a diameter $D_a = 2R_a$. The inner cylindrical track is formed by the outer cylinder face of an inner clutch ring whereas the outer track is formed by the inner cylinder face of an outer clutch ring. The sprags are disposed in such a manner that upon rotation of the clutch rings relative to one another in the locking direction, the sprags wedge with their clutch faces against the cylindrical tracks and generate, at the line of contact between sprag and inner track, a radially outwardly directed normal force $N_i$ in the inner ring and further generate at the line of contact between sprag and outer track, a radially inwardly directed normal force $N_a$ in the outer ring. The clutch faces of the sprags have at the line of contact with the inner or, as the case may be, the outer track, a radius of curvature $r_i$ and $r_a$, respectively. The distance between the centers of the two curvatures is designated at $c$. The inner wedging angle $\epsilon_i$ and the outer wedging angle $\epsilon_a$ between the plane containing the two lines of contact and the plane containing one of these lines of contact and the rotary axis of the overrunning clutch are determined by the following equations:

$$\epsilon_i = \frac{1}{1 - R_i/R_a} \cdot \arccos \frac{(R_i + r_i)^2 + (R_a - r_a)^2 - c^2}{2 \cdot (R_i + r_i) \cdot (R_a - r_a)} \quad (1)$$

and, respectively, $$\epsilon_a = \frac{R_i}{R_a - R_i} \cdot \arccos \frac{(R_i + r_i)^2 + (R_a - r_a)^2 - c^2}{2 \cdot (R_i + r_i) \cdot (R_a - r_a)}. \quad (2)$$

In this manner, the torques $T_i$ and $T_a$ related to the inner ring and the outer ring, respectively, are obtained as $$T_i = z N_i R_i \tan \epsilon_i \quad (3)$$

and, respectively, $$T_a = z N_a R_a \tan \epsilon_a, \quad (4)$$

wherein $$T_i = T_a = T.$$

The relative rotation between the inner ring and the outer ring, occurring during application of load, is designated by rotational angle $\alpha$.

Figure 1:
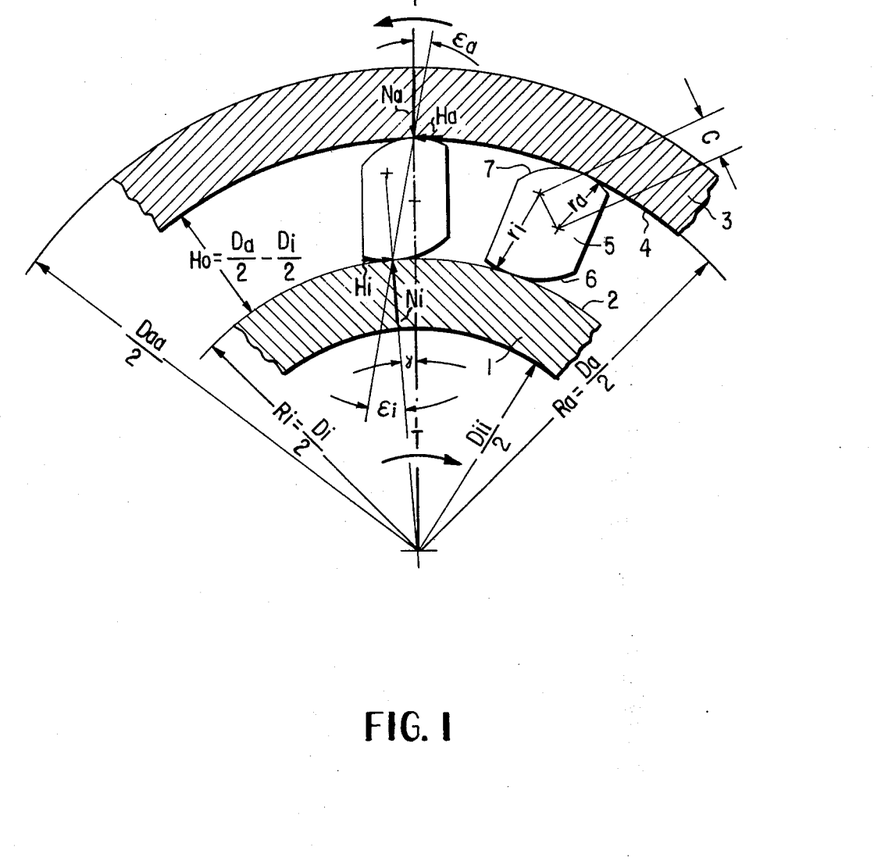
FIG. 1 is a fragmentary schematic cross-sectional view of a radially wedging, frictional overriding clutch showing scalar and vectorial magnitudes.

The computation of sprag-type overrunning clutches is effected in a conventional manner with the aid of the above-given or related relationships. For a more detailed explanation of these relationships reference is made to FIG. 1 which shows a fragmentary radial section of an overrunning clutch with the more important forces appearing upon torque transmission at the sprag. The outer cylindrical surface of the inner ring 1 constitutes the inner sprag track 2, while the inner cylindrical surface of the outer ring 3 constitutes the outer sprag track 4. Between the inner ring and the outer ring there are positioned the circumferentially arranged sprags 5 which can wedge with their inner clutch face 6 against the inner track 2 and with their outer clutch face 7 against the outer track 4. Upon such an occurrence the forces illustrated in FIG. 1 are generated. In the lines of contact between the sprags and the sprag tracks there act the above-mentioned normal forces $N_i$ and $N_a$ and the circumferential forces $H_i$ and $H_a$. In order to ensure an equilibrium of force, the resultants of $N_i$ and $H_i$ and, respectively, $N_a$ and $H_a$ have to lie on the same line of action, must be oppositely oriented and must be of identical magnitude, as illustrated in FIG. 1. If one considers that $$H_i = N_i \tan \epsilon_i$$

and, respectively, $$H_a = N_a \tan \epsilon_a,$$

for the torque $T = T_i = T_a$ there can be obtained immediately the relationships (3) and (4) set forth earlier. It is noted that $\epsilon_i$ and $\epsilon_a$ are structurally predetermined magnitudes which may be constant or may have, in the wedging zone, a minimum value as disclosed in German Laid-Open Application (Offenlegungsschrift) No. 2,204,305 and German Pat. No. 1,199,066. The computation of $\epsilon_i$ and $\epsilon_a$ may be effected trigonometrically with the aid of equations (1) and (2), respectively.

When the overrunning clutch is placed under load in the coupling direction, there is effected a relative rotation between the inner ring and the outer ring of the overrunning clutch. During this relative rotation, the magnitude of which is dependent from the torque applied to the overrunning clutch, the sprags wedge to a greater or lesser extent against the spring tracks of the rings and in this manner transmit the torque from one ring to the other. If in a coordinate system one plots the torque T versus the relative rotation between the inner and outer ring, designated as $\alpha$, a curve is obtained which, similar to the rotationally elastic clutches, is designated as a torsion spring curve because it indicates the relationship between the load torque and the angle of rotation.

In overrunning clutches which are used as indexing units, the torsion spring curve has a significant effect on the accuracy of indexing. In practice, the driving torque oscillates with a certain deviation about a desired value because of varying properties (thickness, strength, coefficient of friction, radius of curvature, etc.) of the material to be fed. Accordingly, the angle of rotation between the driving and driven component of the overrunning clutch also changes, resulting in an irregular material feed. In many cases, however, it is important that the advance rate be constant, that is, the torsion spring curve be as steep as possible, since the steeper this spring curve, the lesser the variation of the angle of rotation.

In the design of sprag clutches one has generally limited oneself to ensure, with the aid of the above-given relationships, that the values of the wedging angle are always below the maximum permissible coefficient of friction and that Hert's stress between the sprag and the track does not exceed the maximum permissible value. With regard to the generation of the spring curves of predetermined slope, heretofore only empirical values were available. The reason for this is that the rotation of the overrunning clutch rings with respect to one another is based on the elastic deformations of the clutch components and such deformations could heretofore not be determined mathematically. A known method of computation for the torsion spring curve applies only to overrunning clutch rings having a very small wall thickness. Such an initial condition, however, is not present in overrunning clutches operating with sprags. Further, the variation of the wedging angle as a function of increasing angle of rotation is not taken into account. Such known method is discussed in the work by C. B. Biezeno and R. Grammel, entitled TECHNISCHE DYNAMIK, volume 1, 2nd edition (publisher: Springer, 1953).

maximum of the quotient $T/\alpha$, $R_i$ is corrected by subtracting therefrom the extent of compression $u_i$ of the inner ring caused by an assumed normal force $N = N_i = N_a$ at the location of engagement between the sprag and the inner ring and $R_a$ is corrected by adding thereto the extent of expansion $u_a$ of the outer ring caused by an assumed normal force $N = N_i = N_a$ at the location of engagement between the sprag and the outer ring. Thus, $$u_i = \frac{z \cdot N}{2 \cdot \pi \cdot E \cdot L_i} \cdot \left\{ -[(1-\nu)+(1+\nu)\cdot\beta_i^2] \cdot \frac{1}{1-\beta_i^2} + 4 \cdot \sum_{n=1}^{\infty} [-m(1+\nu)\cdot\overline{C}_{im1} + m(1+\nu)\cdot\overline{C}_{im2} - [(m-2)+\nu(m+2)]\cdot\overline{C}_{im3} + [(m+2)+\nu(m-2)]\cdot\overline{C}_{im4}] \cdot \frac{J_1(a_{in})}{a_{in}} \right\} \quad (5)$$

and, $$u_a = \frac{z \cdot N}{2 \cdot \pi \cdot E \cdot L_a} \cdot \left\{ -[(1-\nu)\beta_a^2+(1+\nu)] \cdot \frac{1}{1-\beta_a^2} + 4 \cdot \sum_{n=1}^{\infty} [-m(1+\nu)\cdot\overline{C}_{am1}\cdot\beta_a^{m-2} + m(1+\nu)\cdot\overline{C}_{am2}\cdot\beta_a^{-m-2} - [(m-2)+\nu(m+2)]\cdot\overline{C}_{am3}\beta_a^m + [(m+2)+\nu(m-2)]\cdot\overline{C}_{am4}\cdot\beta_a^{-m}] \cdot \frac{J_1(a_{an})}{a_{an}} \right\} \quad (6)$$

SUMMARY OF THE INVENTION

It is an object of the invention to provide an improved overrunning clutch for a given space of installation wherein the relative rotation between the two clutch rings (angle of rotation) assumes for a given driving torque the smallest possible value for the purpose of maintaining the oscillations of the angle of rotation caused by torque fluctuations, at a smallest possible value. In designing the overrunning clutch in such a manner, first of all the elastic deformations of all components, particularly relatively thick clutch rings and the thus resulting variations of the wedging angle and other dependent magnitudes are to be taken into account as accurately as possible.

This object and others to become apparent as the specification progresses are accomplished by the invention, according to which, briefly stated, while varying the ring thickness ratio of at least one of the two clutch rings in the sense of a maximum of the quotient driving torque/angle of rotation, the radius of the inner track is determined by subtracting from the nominal radius of the inner track the extent of compression of the inner ring, at the location of contact with the sprags, caused by an assumed normal force. The radius of the outer track is determined by adding to the nominal radius of the outer track the extent of expansion of the outer ring, at the location of contact with the sprags, caused by an assumed normal force.

BRIEF DESCRIPTION OF THE DRAWINS

DESCRIPTION OF THE INVENTION

By varying at least one of the ring thickness ratios $\beta_a$ or $\beta_i$ ($\beta_a = D_{aa}/D_a$ and $\beta_i = D_i/D_{ii}$) in the sense of a wherein $L_i$ *the and* $L_a$ are, respectively, the length of the sprag portion engaging the inner and the outer ring;

$\nu$ is Poisson's number;

$E$ is the modulus of elasticity;

$m = n \cdot z$ with summation index $n = 1, 2, 3, 4, 5, \ldots$;

$J_1(a_{in}) =$ a Bessel function of the first order for a Fourier digit index n;

$$a_{in} = \frac{m}{R_i} \sqrt{\frac{8}{\pi} \cdot \frac{1}{E} \cdot \frac{1}{L_i} \cdot \frac{r_i \cdot R_i}{(R_i + r_i)}} \cdot N_i \;;$$

$J_1(a_{an}) =$ a Bessel function of the first order for a Fourier digit index n;

$$a_{an} = \frac{m}{R_a} \sqrt{\frac{8}{\pi} \cdot \frac{1}{E} \cdot \frac{1}{L_a} \cdot \frac{r_a \cdot R_a}{(R_a - r_a)}} \cdot N_a;$$

$\overline{C}_{imk}$ for $k = 1$ to 4:

| k | $\overline{C}_{imk}$ |
|---|---|
| 1 | $\frac{-(m-1) + m\beta_i^2 - \beta_i^{2m}}{2 \cdot (m-1) \cdot K_i^z}$ |
| 2 | $\frac{-(m+1) + m\beta_i^2 + \beta_i^{2m}}{2 \cdot (m+1) \cdot K_i^z}$ |
| 3 | $\frac{-(m+1) + m\beta_i^{-2} + \beta_i^{-2m}}{2 \cdot (m+1) \cdot K_i^z}$ |
| 4 | $\frac{-(m-1) + m\beta_i^{-2} - \beta_i^{-2m}}{2 \cdot (m-1) \cdot K_i^z}$ |

$K_i^z = 2 \cdot (m^2 - 1) - m^2(\beta_i^2 + \beta_i^{-2}) + (\beta_i^{2m} + \beta_i^{-2m})$;

$\overline{C}_{amk}$ for $k = 1$ to 4:

| k | $\overline{C}_{amk}$ |
|---|---|
| 1 | $\frac{-(m-1) + m\beta_a^{-2} - \beta_a^{-2m}}{2 \cdot (m-1) \cdot K_a^z} \beta_a^{-m+2}$ |
| 2 | $\frac{-(m+1) + m\beta_a^{-2} + \beta_a^{-2m}}{2 \cdot (m+1) \cdot K_a^z} \beta_a^{m+2}$ |
| 3 | $\frac{-(m+1) + m\beta_a^2 + \beta_a^{-m}}{2 \cdot (m+1) \cdot K_a^z} \beta_a^{-m}$ |
| 4 | $\frac{-(m+1) + m\beta_a^2 + \beta_a^{-2m}}{2 \cdot (m+1) \cdot K_a^z} \beta_a^m$ |

$K_a^z = 2 \cdot (m^2 - 1) - m^2(\beta_a^2 + \beta_a^{-2}) + (\beta_a^{2m} + \beta_a^{-2m})$ and wherein, taking into account the corrected sprag track radii, the torque corresponding to the normal force $N$ is determined from equations (3) and (1) and wherein the angle of rotation $\alpha$ belonging to $N$ is to be determined from the following equation:

$$\alpha = \left(\frac{r_a}{R_{ac}} + \frac{r_i}{R_{ic}}\right) \left\{\arcsin\left[\left(\frac{R_a - r_a}{c}\right) \cdot \sqrt{\frac{c^2 - (R_i + r_i - R_a + r_a)^2}{(R_i + r_i)(R_a - r_a)}}\right]\right.$$
$$\left. - \arcsin\left[\left(\frac{R_{ac} - r_a}{c}\right) \cdot \sqrt{\frac{c^2 - (R_{ic} + r_i - R_{ac} + r_a)^2}{(R_{ic} + r_i)(R_{ac} - r_a)}}\right]\right\}$$
$$+ \sqrt{\frac{c^2 - (R_{ic} + r_i - R_{ac} + r_a)^2}{(R_{ic} + r_i)(R_{ac} - r_a)}} - \sqrt{\frac{c^2 - (R_i + r_i - R_a + r_a)^2}{(R_i + r_i)(R_a - r_a)}} \quad (7)$$

wherein
$R_{ic} = R_i - u_i$, and
$R_{ac} = R_a + u_a$
wherein the angle $\alpha$ is measured in radian.

The design of an overrunning clutch according to the invention is based on the recognition that radial deformations of the clutch components appearing during load have a decisive effect on the operational behavior.

For determining these deformations, first a mathematical expression had to be found for the surface pressure distribution appearing in a discontinuous manner at the circumference of the rings. By developing a Fourier series there could be generated a stress distribution extending in a continuous manner over the circumference of the rings; this stress distribution can be made to approximate with arbitrary accuracy the actual, discontinuous surface pressure distribution by using an arbitrarily large number of summation members. For determining the radial and tangential stresses in the rings, differential equations pertaining to the theory of elasticity have been taken as a basis for the planar stress conditions in polar coordinates. The solution was effected by means of Airy's stress function in which the above-mentioned Fourier series was introduced as boundary condition. From the stresses determined in the above manner there were obtained, by means of double integration, the desired deformations according to equations (5) and (6).

The members $$\sum_{n=1}^{\infty} [\ldots] \ldots \}$$

in the equation (5) and the members $$\sum_{n=1}^{\infty} \ldots \{\ldots\}$$

in the equation (6) are convergent series which may be expediently solved with numerical methods known by themselves. With regard to such methods reference is made to I. N. Bronstein and K. A. Semendjajew: TASCHENBUCH DER MATHEMATIK (publisher: Harri Deutsch, 1966) as well as to W. I. Smirnow: LEHRGANG DER HOHEREN MATHEMATIK, Part 2 (publisher: VEB, Berlin, 1964). For the computation of the Bessel functions $J_1(a_{in})$ and $J_1(a_{an})$ there is available a very simple approximation polynomial which will show a deviation of only $4 \cdot 10^{-8}$ in case six members are used. In this connection, reference is made to M. Abramowitz and A. Stegun: HANDBOOK OF MATHEMATICAL FUNCTIONS (Dover Publications, Inc., 1965).

With the computed radial deformations $u_i$ and $u_a$ the track radii $R_i$ and $R_a$ and thus the wedging angle according to equation (1) are corrected and with the aid of the corrected values, the torque T is determined according to equations (3) and (4) and further, the angle of rotation $\alpha$ is determined from the equation (7).

Based on the further recognition that the angular displacement $\alpha$ between the inner and the outer clutch rings depends in a significant extent from the ring thickness ratio $\beta_i$ and/or $\beta_a$, the above-described computation is to be carried out with different ring thickness ratios until that ring thickness ratio is found at which the quotient $T/\alpha$ has a maximum value. This then means that the torsion spring curve has the steepest possible course. In this case during torque oscillations of the structure the smallest possible changes in $\alpha$ will take place.

Since in the mathematical determination of the deformations, to approximation polynomials had to be resorted for attaining exact results, it is expedient to utilize those normal forces in the computation which amount to approximately 5% of the normal forces appearing for the nominal torque. For values of this order of magnitude there still do not appear any significant deviations by the use of the approximation polynomials.

In a further development of the invention it has been proven particularly expedient to take into account not only the deformations of the rings but also the deformation of the sprags. Thus, the compression $u_{KKi}$ of the sprag at its inner clutch face caused by the assumed normal force N at its inner clutch face and the compression $u_{KKa}$ of the sprag at its clutch face caused by the assumed normal force N at its outer clutch face are determined according to the following equation:

$$u_{KKi} = \frac{2}{\pi} \cdot \frac{1 - \nu^2}{E} \cdot \frac{N}{L_i} \cdot [1{,}1931 + \ln(\frac{R_i + r_i}{2 \cdot R_i \cdot r_a} \cdot L_i) - \tfrac{1}{2} \cdot \ln(\frac{2}{\pi} \cdot \frac{1 - \nu^2}{E} \cdot \frac{(R_i + r_i)N}{R_i \cdot r_i \cdot L_i})] \quad (8)$$

and $$u_{KKa} = \frac{2}{\pi} \cdot \frac{1 - \nu^2}{E} \cdot \frac{N}{L_a} \cdot [1{,}1931 + \ln(\frac{R_a - r_a}{2 \cdot R_a \cdot r_a} L_a) - \tfrac{1}{2} \cdot \ln(\frac{2}{\pi} \cdot \frac{1 - \nu^2}{E} \cdot \frac{(R_a - r_a)N}{R_a \cdot r_a \cdot L_a})] \quad (9)$$

The above values are subtracted from the radius of curvature $r_i$ and $r_a$ (that is, the load-free radii of curvature) and these new radii of curvature, together with the track radii corrected according to equations (5) and (6) are utilized accordingly.

An alteration of the ring thickness ratio $\beta_i$ and/or $\beta_a$ is the easiest to effect from the technological point of view. Because of cost considerations, one generally operates in a large torque range (from approximately 10 to 1,000 kpm which corresponds to a range of an outer diameter $D_{aa}$ of 50 mm to 400 mm) with the same sprags. It may be expedient, however, to optimize the course of the torsion spring curve not or not only by the above-described variation of the ring thickness ratio but by means of a systematic variation of the course of the wedging angle and/or the difference of the track diameter. Here again, as described above, the track radii $R_i$ and $R_a$ which are present in the load-free condition of the overrunning clutch, are to be corrected by the radial deformations of the inner and outer ring in accordance with the equations (5) and (6). With the corrected sprag track radii then the angle of rotation $\alpha$ is determined from the equation (7) and is minimized by varying the values of the wedging angle.

Figure 2:
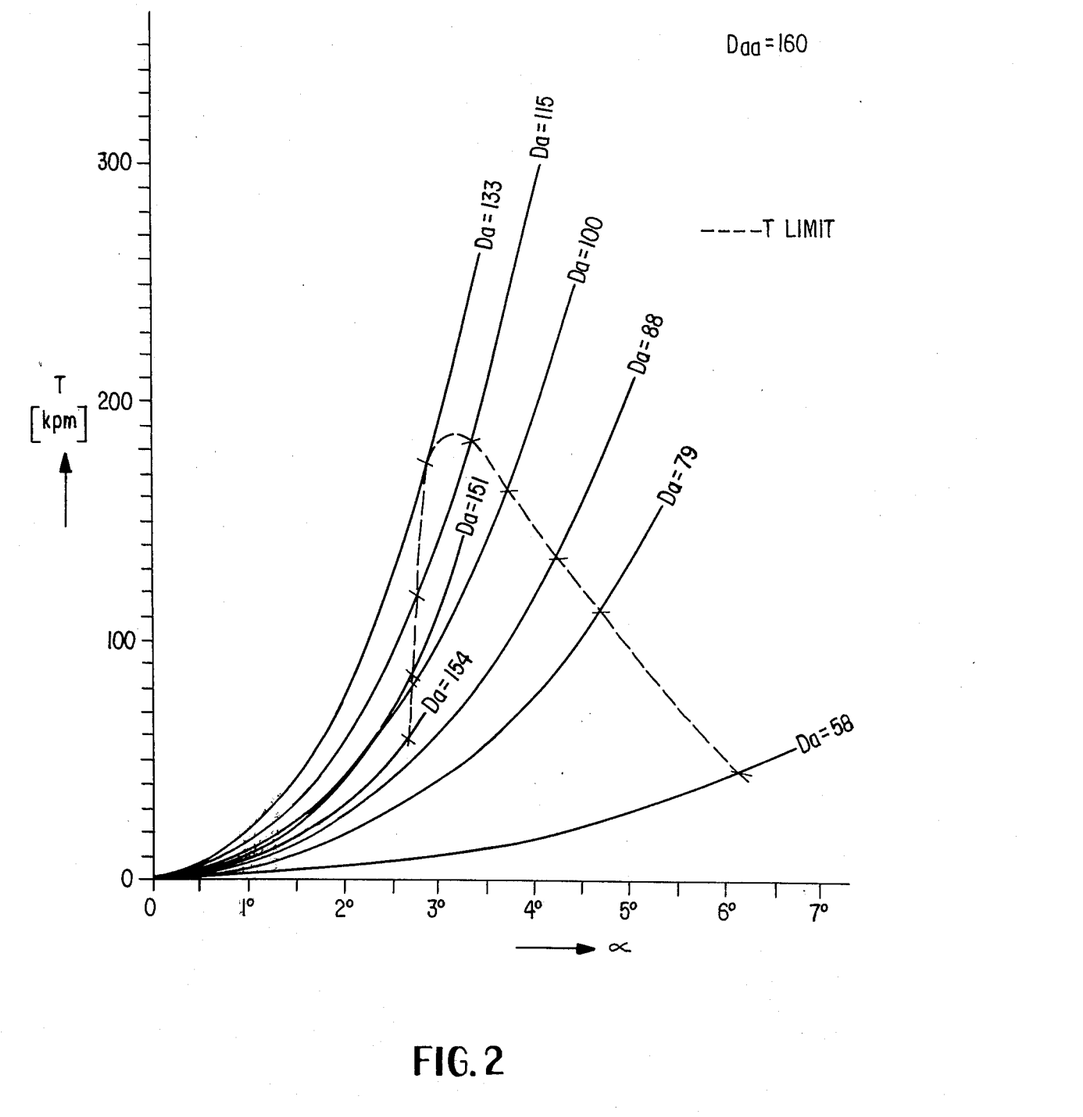
FIGS. 2 to 4 are diagrams illustrating the torsion spring curves (torque versus angle of rotation) of overrunning clutches of different dimensions.
Figure 3:
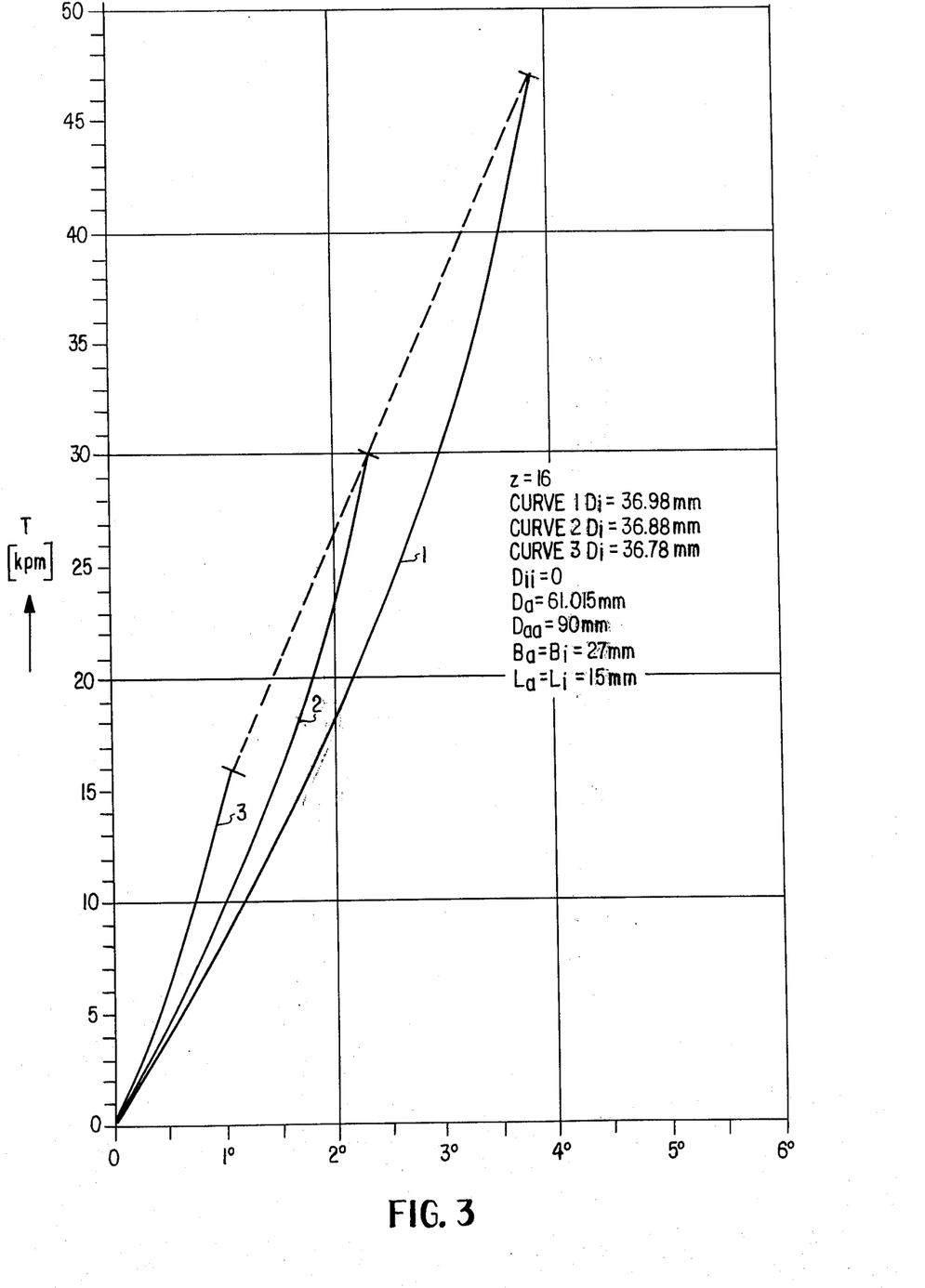
Figure 4:
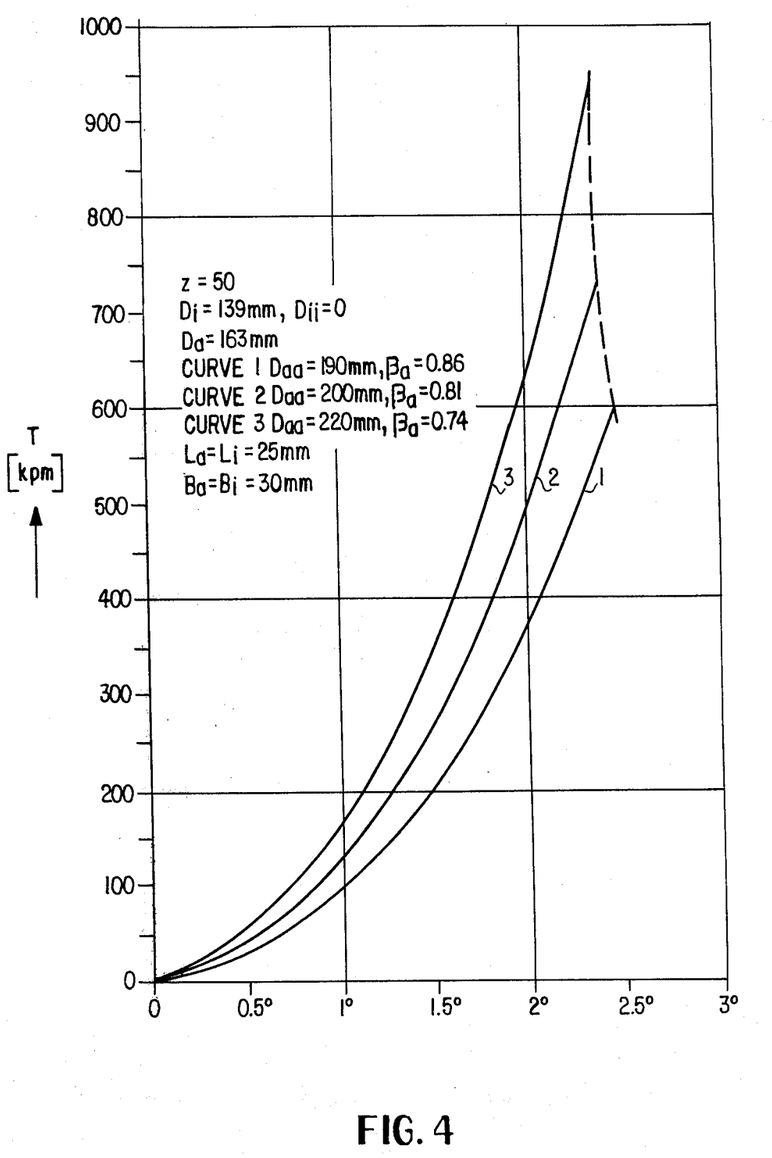

FIGS. 2–4 show the spring curves of different overrunning clutches wherein in each case along the ordinate there are measured the torque T in kpm and along the abscissa there are measured the belonging angle of rotation $\alpha$. Further, in the diagrams the dimensions of the significant clutch components are also given.

FIG. 2 clearly shows that for a given space of installation ($D_{aa}$ = 160 mm; $D_{ii}$ = 0 mm) there exists a ring thickness ratio $\beta = D_{aa}/D_a$ in which the course of the spring curve is the steepest. For all other $\beta$ values the spring curve is flatter. Further, in FIG. 2 there is illustrated for each spring curve the associated maximum torque and these points are connected by a broken line. It is seen that to the maximum possible torque there belongs a ring thickness ratio which is different from that for the steepest possible curve.

FIG. 2 further shows that occasionally two curves may intersect one another (for example, for $D_a$ = 100 and $D_a$ = 151 mm). It was found that such a phenomenon occurs only in the range of the median curve slopes. For the zone of maximum curve slope which is of interest here, such an intersection will not occur and it is ensured that the curve of maximum slope determined under conditions of a relatively small normal force will be superior to all other curves with respect to their slope even at a nominal torque.

Turning now to FIG. 3, there are illustrated the spring curves of three overrunning clutches in which the ring thickness ratio $\beta_i$ of the inner ring was varied while the dimensions of the other clutch components, particularly that of the outer ring were held constant. By means of the varying clearance height $H_o = D_a/2 - D_i/2$ the positional angle of the sprag, that is, its tilted position relative to the sprag tracks is influenced. This causes changes in the course of the wedging angle. These changes — as clearly shown in FIG. 3 — significantly affect the slope of the spring curve. In any event, in case of a steep curve course, desired because of reasons of indexing accuracy, there should be taken into account a decrease of the maximum transmissible torque, since the limit for the admissible coefficient of friction is reached earlier, as it may be seen from the limit line drawn in broken lines in FIG. 3.

FIG. 4 illustrates three overrunning clutches in which the outer diameter $D_{aa}$ of the outer ring has been increased while maintaining the other dimensions constant. As it can be seen, this measure, too, causes an increase in the slope of the torsion spring curve. But, as opposed to FIG. 3, there is achieved here an increase of the maximum transmissible torque.

In FIGS. 3 and 4, z is the number of sprags, $L_a$ and $L_i$ are the length of the sprag portion engaging, respectively, the outer and the inner ring, $B_a$ and $B_i$ are the width of, respectively, the outer and the inner ring.

It is within the scope of the invention to vary not only the ring thickness ratio but in addition the cross-sectional shape of the sprag — that is, the magnitudes $c$, $r_i$, $r_a$ — and thus achieve a maximum slope of the torsion spring curve.

It will be understood that the above description of the present invention is susceptible to various modifications, changes and adaptations, and the same are intended to be comprehended within the meaning and range of equivalents of the appended claims.

Also it is within the scope of the invention to build a clutch, whose quotient $T/\alpha$ is within 3 or 6 or 10 % besides the calculated maximum value.

What is claimed is:

1. In a radially wedging, frictional overrunning clutch having an inner ring and an outer ring arranged concentrically with the inner ring; the inner ring having an inner diameter $D_{ii}$ and an outer diameter $D_i=2R_i$; the inner ring further having an outer cylindrical surface constituting an inner track of the diameter $D_i=2R_i$; the outer ring having an outer diameter $D_{aa}$ and an inner diameter $D_a=2R_a$; the outer ring further having an inner cylindrical surface constituting an outer track of of the diameter $D_a=2R_a$; the ring thickness ratio for the outer ring being $\beta_a = D_{aa}/D_a$ and the ring thickness ratio for the inner ring being $\beta_i=D_i/D_{ii}$; sprags of a profiled cross section disposed between the inner and the outer tracks in a circumferential series; each sprag having an inner clutch face cooperating with the inner track and having, at the location of contact, a radius of curvature $r_i$ and an outer clutch face cooperating with the outer track and having at the location of contact, a radius of curvature $r_a$; each sprag being arranged such that upon relative rotation between the inner and the outer rings relative to one another in the direction of clutch engagement, the clutch faces of each sprag wedge against the respective track along a line of contact whereby a radially outwardly oriented normal force $N_i$ is generated in the inner ring at the line of contact, and whereby a radially inwardly oriented normal force $N_a$ is generated in the outer ring at the line of contact; the centers of the two clutch face curvatures being spaced at a distance $c$; and wherein the inner and the outer wedging angle $\epsilon_i$ and $\epsilon_a$, respectively, defined by a plane containing both lines of contact and a plane containing one of the two lines of contact and the rotary axis of the overrunning clutch, is determined by $$\epsilon_i = \frac{1}{1 - R_i/R_a} \cdot \arccos \frac{(R_i + r_i)^2 + (R_a - r_a)^2 - c^2}{2 \cdot (R_i + r_i) \cdot (R_a - r_a)} \quad (1)$$

and, respectively, $$\epsilon_a = \frac{R_i}{R_a - R_i} \cdot \arccos \frac{(R_i + r_i)^2 + (R_a - r_a)^2 - c^2}{2 \cdot (R_i + r_i) \cdot (R_a - r_a)} \quad (2)$$

whereby the torques $T_i$ and $T_a$ transmitted to the inner ring and the outer ring, respectively, is determined by $$T_i = zN_iR_i\tan\epsilon_i \quad (3)$$

and, $$T_a = zN_aR_a\tan\epsilon_a; \quad (4)$$

and wherein $T_i = T_a = T$ and wherein the relative rotation between the inner clutch ring and the outer clutch ring appearing upon application of load is designated with the angle of rotation $\alpha$, the improvement wherein by varying at least one of the ring thickness ratios $\beta_a$ or $\beta_i$ in the sense of a maximum of the quotient $T/\alpha$, $R_i$ is corrected by subtracting therefrom the extent of compression $u_i$ of the inner ring caused by an assumed normal force $N = N_i = N_a$ at the location of engagement between the sprag and the inner ring and $R_a$ is corrected by adding thereto the extent of expansion $u_a$ of the outer ring caused by an assumed normal force $N = N_i = N_a$ at the location of engagement between the sprag and the outer ring, and wherein $$u_i = \frac{z \cdot N}{2 \cdot \pi \cdot E \cdot L_i} \cdot \left\{ -[(1-\nu)+(1+\nu)\cdot\beta_i^2] \cdot \frac{1}{1-\beta_i^2} + 4 \cdot \sum_{n=1}^{\infty} [-m(1+\nu) \cdot \overline{C}_{im1} + m(1+\nu) \cdot \overline{C}_{im2} - [(m-2)+\nu(m+2)] \cdot \overline{C}_{im3} + [(m+2)+\nu(m-2)] \cdot \overline{C}_{im4}] \cdot \frac{J_1(a_{in})}{a_{in}} \right\} \quad (5)$$

and, $$u_a = \frac{z \cdot N}{2 \cdot \pi \cdot E \cdot L_a} \cdot \left\{ -[(1-\nu)\beta_a^2+(1+\nu)] \cdot \frac{1}{1-\beta_a^2} + 4 \cdot \sum_{n=1}^{\infty} [-m(1+\nu) \cdot \overline{C}_{am1} \cdot \beta_a^{m-2} + m(1+\nu) \cdot \overline{C}_{am2} \cdot \beta_a^{-m-2} - [(m-2)+\nu(m+2)] \cdot \overline{C}_{am3} \beta_a^m + [(m+2)+\nu(m-2)] \cdot \overline{C}_{am4} \cdot \beta_a^{-m}] \cdot \frac{J_1(a_{an})}{a_{an}} \right\} \quad (6)$$

wherein
$m = n \cdot z$ with summation index $n = 1, 2, 3, 4, 5, \ldots$;
$J_1(a_{in}) = $ a Bessel function of the first order for a Fourier digit index n;

$$a_{in} = \frac{m}{R_i} \sqrt{\frac{8}{\pi} \cdot \frac{1}{E} \cdot \frac{1}{L_i} \cdot \frac{r_i \cdot R_i}{(R_i + r_i)} \cdot N_i} \quad;$$

$J_1(a_{an}) = $ a Bessel function of the first order for a Fourier digit index n;

$$a_{an} = \frac{m}{R_a} \sqrt{\frac{8}{\pi} \cdot \frac{1}{E} \cdot \frac{1}{L_a} \cdot \frac{r_a \cdot R_a}{(R_a - r_a)} \cdot N_a};$$

$\overline{C}_{imk}$ for $k = 1$ to 4:

| k | $\overline{C}_{imk}$ |
|---|---|
| 1 | $\frac{-(m-1) + m\beta_i^2 - \beta_i^{2m}}{2 \cdot (m-1) \cdot K_i^x}$ |
| 2 | $\frac{-(m+1) + m\beta_i^2 + \beta_i^{2m}}{2 \cdot (m+1) \cdot K_i^x}$ |
| 3 | $\frac{-(m+1) + m\beta_i^{-2} + \beta_i^{-2m}}{2 \cdot (m+1) \cdot K_i^x}$ |
| 4 | $\frac{-(m-1) + m\beta_i^{-2} - \beta_i^{-2m}}{2 \cdot (m-1) \cdot K_i^x}$ |

$K_i^x = 2 \cdot (m^2-1) - m^2(\beta_i^2 + \beta_i^{-2}) + (\beta_i^{2m} + \beta_i^{-2m})$;

$$u_{KKi} = \frac{2}{\pi} \cdot \frac{1-\nu^2}{E} \cdot \frac{N}{L_i} \cdot [1{,}1931 + \ln(\frac{R_i + r_i}{2 \cdot R_i \cdot r_a} \cdot L_i) - \tfrac{1}{2} \cdot \ln(\frac{2}{\pi} \cdot \frac{1-\nu^2}{E} \cdot \frac{(R_i+r_i)N}{R_i \cdot r_i \cdot L_i})] \quad (8)$$

and $$u_{KKa} = \frac{2}{\pi} \cdot \frac{1-\nu^2}{E} \cdot \frac{N}{L_a} \cdot [1{,}1931 + \ln(\frac{R_a - r_a}{2 \cdot R_a \cdot r_a} \cdot L_a) - \tfrac{1}{2} \cdot \ln(\frac{2}{\pi} \cdot \frac{1-\nu^2}{E} \cdot \frac{(R_a-r_a)N}{R_a \cdot r_a \cdot L_a})] \quad (9)$$

$\overline{C}_{amk}$ for $k = 1$ to 4:

| k | $\overline{C}_{amk}$ |
|---|---|
| 1 | $\frac{-(m-1) + m\beta_a^{-2} - \beta_a^{-2m}}{2 \cdot (m-1) \cdot K_a^x} \beta_a^{-m+2}$ |
| 2 | $\frac{-(m+1) + m\beta_a^{-2} + \beta_a^{-2m}}{2 \cdot (m+1) \cdot K_a^x} \beta_a^{m+2}$ |
| 3 | $\frac{-(m+1) + m\beta_a^2 + \beta_a^{-m}}{2 \cdot (m+1) \cdot K_a^x} \beta_a^{-m}$ |
| 4 | $\frac{-(m+1) + m\beta_a^2 + \beta_a^{-2m}}{2 \cdot (m+1) \cdot K_a^x} \beta_a^{m}$ |

$K_a^x = 2 \cdot (m^2-1) - m^2(\beta_a^2 + \beta_a^{-2}) + (\beta_a^{2m} + \beta_a^{-2m})$ and wherein, while taking into consideration the corrected track radii, the torque corresponding to the normal force N is obtained from equations (3) and (1) and wherein the angle of rotation $\alpha$ belonging to the normal force is determined by the following equation:

$$\alpha = \left(\frac{r_a}{R_{ac}} + \frac{r_i}{R_{ic}}\right) \left\{ \arcsin\left[\left(\frac{R_a - r_a}{c}\right) \cdot \sqrt{\frac{c^2 - (R_i + r_i - R_a + r_a)^2}{(R_i + r_i)(R_a - r_a)}}\right] - \arcsin\left[\left(\frac{R_{ac} - r_a}{c}\right) \cdot \sqrt{\frac{c^2 - (R_{ic} + r_i - R_{ac} + r_a)^2}{(R_{ic} + r_i)(R_{ac} - r_a)}}\right]\right\} + \sqrt{\frac{c^2 - R_{ic} + r_i - R_{ac} + r_a)^2}{(R_{ic} + r_i)(R_{ac} - r_a)}} \sqrt{\frac{c^2 - (R_i + r_i - R_a + r_a)^2}{(R_i + r_i)(R_a - r_a)}} \quad (7)$$

wherein
$R_{ic} = R_i - u_i$, and
$R_{ac} = R_a + u_a$
and wherein $\alpha$ is measured in radian.

2. An overrunning clutch as defined in claim 1, wherein for the normal force $N = N_i N_a$ there is assumed a value in the order of magnitude of 5% of the normal force appearing at nominal torque.

3. An overrunning clutch as defined in claim 1, wherein a compression $u_{KKi}$ of said sprag at its inner clutch face caused by N and a compression $u_{KKa}$ of said sprag at its outer clutch face caused by N are determined by and is subtracted from $r_i$ and $r_a$, respectively, to obtain a corrected value therefor; and further, the corrected $r_i$ and $r_a$ values and the corrected $R_i$ and $R_a$ values obtained from equations (5) and (6) are to be utilized in the equations (5) to (7).

4. An overrunning clutch as defined in claim 1, wherein the dimensions $c$, $r_i$ and $r_a$ are also varied in the sense of a maximum quotient $T/\alpha$.

5. An overrunning clutch as defined in claim 1, wherein the admissible limit values for $p_H$, $\epsilon$ and $\sigma_\phi$ are reached approximately simultaneously by selecting a clutch material of proper hardness and strength, where $p_H$ = Hertz's stress between track and corresponding clutch face and $\sigma_\phi$ = tangential stress in the rings.

6. An overrunning clutch as defined in claim 1, wherein the admissible limit values for $p_H$, $\epsilon$ and $\sigma_\phi$ are reached approximately simultaneously by varying the sectional shape of the sprags, where $p_H$ = Hertz's stress between track and corresponding clutch face and $\sigma_\phi$ = tangential stress in the rings.

7. An overrunning clutch as defined in claim 1, wherein the admissible limit values for $p_H$, $\epsilon$ and $\sigma_\phi$ are reached approximately simultaneously by varying the size of the sprags, where $p_H$ = Hertz's stress between track and corresponding clutch face and $\sigma_\phi$ = tangential stress in the rings.

8. An overrunning clutch as defined in claim 1, wherein the admissible limit values for $p_H$, $\epsilon$ and $\sigma_\phi$ are reached approximately simultaneously by varying the difference between the track diameters, where $p_H$ = Hertz's stress between track and corresponding clutch face and $\sigma_\phi$ = tangential stress in the rings.

9. In a radially wedging, frictional overrunning clutch having an inner ring and an outer ring arranged concentrically with the inner ring; the inner ring having an outer cylindrical surface constituting an inner track; the outer ring having an inner cylindrical surface constituting an outer track; a plurality of sprags of a profiled cross section disposed between the inner and the outer tracks in a circumferential series; each sprag having an inner clutch face cooperating with the inner track and an outer clutch face cooperating with the outer track; each sprag being arranged such that upon rotation between the inner and the outer rings relative to one another in the direction of clutch engagement, the clutch faces of each sprag wedge against the respective track along a line of contact whereby torque is transmitted; the improvement wherein, while varying the ring thickness ratio of at least one of the two rings in the sense of a maximum of the quotient driving torque/angle of rotation, the radius of the inner track is determined by subtracting from the nominal radius of the inner track the extent of compression of the inner ring, at the location of contact with the sprags, caused by an assumed normal force and the radius of the outer track is determined by adding to the nominal radius of the outer track the extent of expansion of the outer ring, at the location of contact with the sprags, caused by an assumed normal force.

* * * * *

UNITED STATES PATENT AND TRADEMARK OFFICE
CERTIFICATE OF CORRECTION

Page 1 of 3

PATENT NO. : 3,978,950
DATED : September 7th, 1976
INVENTOR(S) : Karlheinz Timtner It is certified that error appears in the above-identified patent and that said Letters Patent are hereby corrected as shown below:

Column 2, line 35, change "spring" to --sprag--.

Column 5, last line, change "$4.10^{-8}$" to --$4 \cdot 10^{-8}$--.

Column 7, line 23, change "$\beta$" to --$\beta_\alpha$--; line 24, change "$\beta$" to --$\beta_\alpha$--;

Column 8, line 25, change "$D_{aa}/D_a$" to --$D_{aa}/D_a$--.

Column 9, line 29, change "n.z" to --n·z--.

Column 10, line 46, change "$N = N_i N_a$" to --$N = N_i = N_a$--.

Columns 5 and 6, lines 1-9, change $$a = \left(\frac{r_a}{R_{ac}} + \frac{r_i}{R_{ic}}\right) \left\{\arcsin\left[\left(\frac{R_a - r_a}{c}\right)\sqrt{\frac{c^2 - (R_i + r_i - R_a + r_a)^2}{(R_i + r_i)(R_a - r_a)}}\right]\right.$$
$$\left. - \arcsin\left[\left(\frac{R_{ac} - r_a}{c}\right)\sqrt{\frac{c^2 - (R_{ic} + r_i - R_{ac} + r_a)^2}{(R_{ic} + r_i)(R_{ac} - r_a)}}\right]\right\}$$
$$+ \sqrt{\frac{c^2 - (R_{ic} + r_i - R_{ac} + r_a)^2}{(R_{ic} + r_i)(R_{ac} - r_a)}} - \sqrt{\frac{c^2 - (R_i + r_i - R_a + r_a)^2}{(R_i + r_i)(R_a - r_a)}} \quad (7)$$

to $$\alpha = \left(\frac{r_a}{R_{ac}} + \frac{r_i}{R_{ic}}\right) \left\{\arcsin\left[\left(\frac{R_a - r_a}{c}\right) \cdot \sqrt{\frac{c^2 - (R_i + r_i - R_a + r_a)^2}{(R_i + r_i)(R_a - r_a)}}\right]\right.$$
$$\left. - \arcsin\left[\left(\frac{R_{ac} - r_a}{c}\right) \cdot \sqrt{\frac{c^2 - (R_{ic} + r_i - R_{ac} + r_a)^2}{(R_{ic} + r_i)(R_{ac} - r_a)}}\right]\right\}$$
$$+ \sqrt{\frac{c^2 - (R_{ic} + r_i - R_{ac} + r_a)^2}{(R_{ic} + r_i)(R_{ac} - r_a)}} - \sqrt{\frac{c^2 - (R_i + r_i - R_a + r_a)^2}{(R_i + r_i)(R_a - r_a)}} \quad (7)$$

UNITED STATES PATENT AND TRADEMARK OFFICE
CERTIFICATE OF CORRECTION

PATENT NO. : 3,978,950

DATED : September 7th, 1976

INVENTOR(S) : Karlheinz Timtner

It is certified that error appears in the above-identified patent and that said Letters Patent are hereby corrected as shown below:

Columns 5 and 6, after line 49, change $$u_{KKi} = \frac{2}{\pi} \cdot \frac{1-\nu^2}{E} \cdot \frac{N}{L_i} \cdot [1,1931 + \ln(\frac{R_i+r_i}{2 \cdot R_i \cdot r_a} \cdot L_i) - \frac{1}{2} \cdot \ln(\frac{2}{\pi} \cdot \frac{1-\nu^2}{E} \cdot \frac{(R_i+r_i)N}{R_i \cdot r_i \cdot L_i})] \quad (8)$$

to $$u_{KKi} = \frac{2}{\pi} \cdot \frac{1-v^2}{E} \cdot \frac{N}{L_i} \cdot [1,1931 + \ln(\frac{R_i+r_i}{2 \cdot R_i \cdot r_i} \cdot L_i) - \frac{1}{2} \cdot \ln(\frac{2}{\pi} \cdot \frac{1-v^2}{E} \cdot \frac{(R_i+r_i)N}{R_i \cdot r_i \cdot L_i})] \quad (8)$$

Columns 9 and 10, lines 32-39, change $$\alpha = \left(\frac{r_a}{R_{ac}} + \frac{r_i}{R_{ic}}\right) \left\{ \arcsin\left[\left(\frac{R_a-r_a}{c}\right) \sqrt{\frac{c^2-(R_i+r_i-R_a+r_a)^2}{(R_i+r_i)(R_a-r_a)}}\right] - \arcsin\left[\left(\frac{R_{ac}-r_a}{c}\right) \sqrt{\frac{c^2-(R_{ic}+r_i-R_{ac}+r_a)^2}{(R_{ic}+r_i)(R_{ac}-r_a)}}\right] \right\} + \sqrt{\frac{c^2-R_{ic}+r_i-R_{ac}+r_a)^2}{(R_{ic}+r_i)(R_{ac}-r_a)}} \sqrt{\frac{c^2-(R_i+r_i-R_a+r_a)^2}{(R_i+r_i)(R_a-r_a)}} \quad (7)$$

to $$\alpha = \left(\frac{r_a}{R_{ac}} + \frac{r_i}{R_{ic}}\right) \left\{ \arcsin\left[\left(\frac{R_a-r_a}{c}\right) \cdot \sqrt{\frac{c^2-(R_i+r_i-R_a+r_a)^2}{(R_i+r_i)(R_a-r_a)}}\right] \right.$$
$$\left. - \arcsin\left[\left(\frac{R_{ac}-r_a}{c}\right) \cdot \sqrt{\frac{c^2-(R_{ic}+r_i-R_{ac}+r_a)^2}{(R_{ic}+r_i)(R_{ac}-r_a)}}\right] \right\}$$
$$+ \sqrt{\frac{c^2-(R_{ic}+r_i-R_{ac}+r_a)^2}{(R_{ic}+r_i)(R_{ac}-r_a)}} - \sqrt{\frac{c^2-(R_i+r_i-R_a+r_a)^2}{(R_i+r_i)(R_a-r_a)}} \quad (7)$$

UNITED STATES PATENT AND TRADEMARK OFFICE
CERTIFICATE OF CORRECTION

PATENT NO. : 3,978,950
DATED : September 7th, 1976
INVENTOR(S) : Karlheinz Timtner It is certified that error appears in the above-identified patent and that said Letters Patent are hereby corrected as shown below:

Columns 9 and 10, after line 53, change $$u_{KKi} = \frac{2}{\pi} \cdot \frac{1-\nu^2}{E} \cdot \frac{N}{L_i} \cdot [1,1931 + \ln(\frac{R_i+r_i}{2 \cdot R_i \cdot r_i} \cdot L_i) - \tfrac{1}{2} \cdot \ln(\frac{2}{\pi} \cdot \frac{1-\nu^2}{E} \cdot \frac{(R_i+r_i)N}{R_i \cdot r_i \cdot L_i})] \quad (8)$$

to $$u_{KKi} = \frac{2}{\pi} \cdot \frac{1-v^2}{E} \cdot \frac{N}{L_i} \cdot \left[1,1931 + \ln(\frac{R_i + r_i}{2 \cdot R_i \cdot r_i} \cdot L_i) - \frac{1}{2} \cdot \ln(\frac{2}{\pi} \cdot \frac{1-v^2}{E} \cdot \frac{(R_i+r_i)N}{R_i \cdot r_i \cdot L_i})\right] \quad (8)$$

Signed and Sealed this

Fifteenth Day of March 1977

[SEAL]

Attest:

RUTH C. MASON
Attesting Officer

C. MARSHALL DANN
Commissioner of Patents and Trademarks